United States Patent Office 2,847,745
Patented Aug. 19, 1958

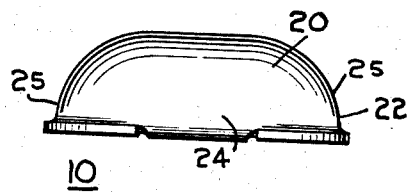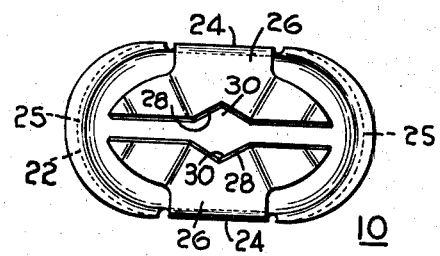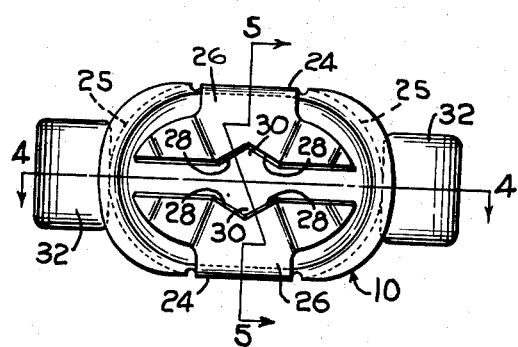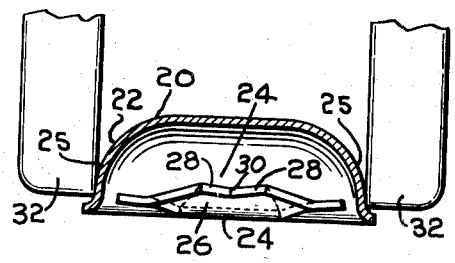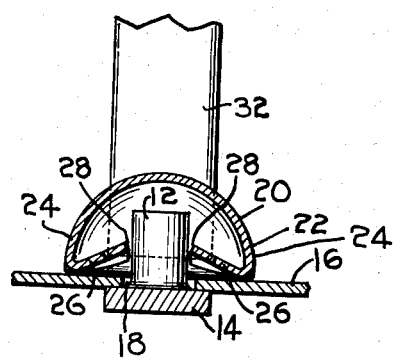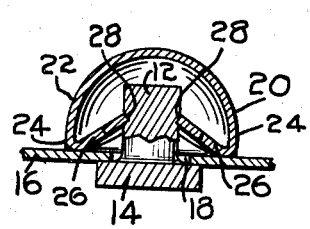
INVENTOR:
PHILIP D. BECKER,
BY Robert E Ross
ATTORNEY.

2,847,745
FASTENING DEVICE

Philip D. Becker, Hingham, Mass., assignor, by mesne assignments, to United-Carr Fastener Corporation, Boston, Mass., a corporation of Delaware Application December 21, 1953, Serial No. 399,498

2 Claims. (Cl. 24—108)

This invention relates generally to securing devices, and has particular reference to a one-piece sheet metal fastener for assembly onto gripping engagement with a stud.

In the manufacture of automobiles, refrigerators, and similar articles in which a nameplate, ornament, or other device is attached to a sheet metal panel, it is customary to provide projecting studs on the device to protrude through suitable openings in the panel, with fastening devices assembled onto the studs on the rear side of the panel to retain the device tightly against the panel.

Fasteners that have been used for this purpose have had a number of disadvantages, in that they do not hold the device tightly enough, or are too expensive, or become loose during service. Many of such fastening devices utilize the principle of the inclined tongue having an end biting into the surface of the stud. One disadvantage of this particular type of fastener is that when it is assembled onto a stud and pushed tightly against the sheet metal panel, the fastener must back off a slight distance to permit the tongues to bite into the stud. Hence the fastener does not pull the stud tightly against the front of the panel.

The object of this invention is to provide a fastening device which is capable of assembly onto a stud so as to bear tightly against a panel through which the stud extends.

A further object of the invention is to provide a fastening device for assembly onto a stud, protruding through a panel in which stud-gripping arms are responsive to flexing of the periphery of the fastener to enable them to initially engage the stud a point closer to the panel when the periphery is flexed in a predetermined manner.

Other objects of the invention will, in part, be obvious, and will, in part, appear hereinafter.

In the drawing:

Fig. 1 is a view in side elevation of a fastening device embodying the features of the invention;

Fig. 2 is a bottom plan view of the fastener of Fig. 1;

Fig. 3 is a bottom plan view of the fastener of Fig. 1 being gripped by a tool for assembly onto a stud;

Fig. 4 is a view in section taken on line 4—4 of Fig. 3;

Fig. 5 is a view in section taken on line 5—5 of Fig. 3;

Fig. 6 is a view in section of the fastener on the stud after the tool holding the fastener has been removed.

Referring to the drawing, there is illustrated a fastening device 10, which is adapted for assembly onto a stud 12 of a device 14, to retain the device in assembly on a panel 16 with the stud extending through an opening 18 in the panel.

The device 14 to be attached to the panel 16 may be a nameplate, ornament, or the like, and may be formed of plastic, die cast metal, or other suitable material. The fastening device 10 is preferably formed of a single piece of sheet metal, and comprises generally a dome-shaped cap portion 20 having a depending periphery 22 which, in the illustrated embodiment, is generally oval in shape, with a pair of elongated substantially parallel side portions 24 disposed between rounded end portions 25. To provide means for engaging the stud 12, a pair of legs 26 are disposed inside the cap, which are integral with the opposing substantially parallel side portions 24, extending generally toward each other and being inclined upwardly, to terminate in opposing biting ends 28 for gripping the stud on opposite sides thereof. To facilitate such engagement, the ends of the legs may be provided with notches 30.

To assemble the fastener onto the stud, the cap 20 is gripped with a suitable tool having jaws 32 which engage the end portions 25 and squeezes them slightly toward each other. This squeezing action of the jaws 32 causes the side portions 24 to move slightly apart, and consequently the ends 28 of the legs also move slightly apart. The ends 28 are originally spaced apart a distance less than the diameter of the stud, and the spreading apart caused by the tool allows the legs to pass over the stud until the periphery 22 of the cap bears against the panel 16.

When the tool is thereafter released, the sides 24 spring back toward each other, which also tends to move the ends of the legs toward each other. However, the ends of the legs are now separated by the stud 12, and the inward flexing of the side portions 24 causes the ends of the legs to tightly engage the stud and draw the fastener down against the panel 16 (see Fig. 6). Hence, the upward movement of the inclined legs 26, necessary to cause the ends thereof to dig into engagement with the stud, is accomplished by the inward movement of the side portions, rather than by the upward movement of the entire fastener.

Since certain obvious changes may be made in the illustrated device without departing from the scope of the invention, it is intended that all matter contained herein be interpreted in an illustrative and not in a limiting sense.

I claim:

1. A securing device for assembly onto a stud comprising a dome shaped cap portion having an elliptical cross section presenting major and minor axes, said cap portion being resiliently compressible along the major axis, said cap portion having a depending peripheral edge, a pair of stud gripping legs disposed on opposing portions of the peripheral edge and extending toward each other and inclined upwardly, said legs bifurcated along the major axis forming a stud receiving aperture and having terminal end portions adapted for biting engagement with a stud to be inserted therebetween.

2. A securing device for assembly onto a stud, comprising a dome shaped cap portion having an elliptical cross section presenting major and minor axes, said cap portion adapted to be resiliently deformed along the major axis, said cap portion having a depending peripheral edge, a pair of stud gripping legs integral with opposing portions of said depending peripheral edge and extending toward each other, the end portions of said legs terminating in spaced relation providing a stud receiving aperture therebetween, said legs being movable toward and away from each other in response to radial flexing of the cap portion along said minor axis.

References Cited in the file of this patent

UNITED STATES PATENTS

| | | |
|---|---|---|
| 1,256,528 | Dieterich | Feb. 19, 1918 |
| 2,339,664 | Tinnerman | Jan. 18, 1944 |
| 2,367,659 | Burke | Jan. 23, 1945 |
| 2,401,207 | Wagstaff | May 28, 1946 |